(12) United States Patent
Ahmadi et al.

(10) Patent No.: US 12,073,567 B2
(45) Date of Patent: Aug. 27, 2024

(54) ANALYSING OBJECTS IN A SET OF FRAMES

(71) Applicant: Imagination Technologies Limited, Kings Langley (GB)

(72) Inventors: Aria Ahmadi, Hertfordshire (GB); David Walton, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/187,831

(22) Filed: Feb. 28, 2021

(65) Prior Publication Data

US 2021/0272295 A1 Sep. 2, 2021

(30) Foreign Application Priority Data

Feb. 27, 2020 (GB) .................................. 2002767
Jan. 19, 2021 (GB) .................................. 2100666

(51) Int. Cl.
*G06T 7/246* (2017.01)
*G06F 18/22* (2023.01)
*G06F 18/23* (2023.01)
*G06T 7/207* (2017.01)

(52) U.S. Cl.
CPC .............. *G06T 7/246* (2017.01); *G06F 18/22* (2023.01); *G06F 18/23* (2023.01); *G06T 7/207* (2017.01); *G06T 7/248* (2017.01); *G06T 2207/20081* (2013.01)

(58) Field of Classification Search
None
See application file for complete search history.

(56) References Cited

U.S. PATENT DOCUMENTS

| | | | |
|---|---|---|---|
| 2017/0083790 A1* | 3/2017 | Risinger | G06V 20/54 |
| 2019/0130583 A1* | 5/2019 | Chen | G06T 7/194 |
| 2019/0251386 A1 | 8/2019 | Piekniewski et al. | |
| 2020/0356827 A1* | 11/2020 | Dinerstein | G06N 3/08 |

FOREIGN PATENT DOCUMENTS

| | | |
|---|---|---|
| EP | 3633614 A1 | 4/2020 |
| WO | 2018102717 A1 | 6/2018 |

OTHER PUBLICATIONS

He et al; "Multi-Camera Object Tracking via Deep Metric Learning"; Proceedings of SPIE; vol. 10827; Jul. 24, 2018; pp. 108271I-1-108271I-9.

(Continued)

*Primary Examiner* — Vikkram Bali
(74) *Attorney, Agent, or Firm* — Potomac Law Group, PLLC; Vincent M DeLuca

(57) ABSTRACT

A method of analysing objects in a first frame and a second frame is disclosed. The method includes segmenting the frames, and matching at least one object in the first frame with a corresponding object in the second frame. The method optionally includes estimating the motion of the at least one matched object between the frames. Also disclosed is a method of generating a training dataset suitable for training machine learning algorithms to estimate the motion of objects. Also provided are processing systems configured to carry out these methods.

18 Claims, 6 Drawing Sheets

(56) References Cited

OTHER PUBLICATIONS

Sun et al; "OVSNet : Towards One-Pass Real-Time Video Object Segmentation"; May 24, 2019; pp. 1-10.
"ARCHIVE3D"; https://web.archive.org/web/20200119123503/https://archive3d.net/; 1 page.
"IMAGEAFTER"; https://web.archive.org/web/20200222104549/http://imageafter.com/; 1 page.
Ahmadi et al; "LikeNet: A Siamese Motion Estimation Network Trained in an Unsupervised Way"; In BMVC, 2018; pp. 1-12.
Ahmadi et al; "Unsupervised convolutional neural networks for motion estimation"; 2016 IEEE International conference on image processing (ICIP); pp. 1629-1633.
Amer et al; "Real-Time Motion Estimation by Objection-Matching for High-Level Video Representation"; Proc. IAPR/CIPPRS Int. Conf.Vision Interface; May 2002; pp. 31-38.
Arnab et al; "Pixelwise Instance Segmentation with a Dynamically Instantiated Network"; In Proceedings of the IEEE Conference on Computer Vision and Pattern Recognition; 2017; pp. 1-21.
Bai et al; Deep Watershed Transform for Instance Segmentation; Proceedings of the IEEE Conference on Computer Vision and Pattern Recognition; 2017; pp. 5221-5229.
Baker et al; "A Database and Evaluation Methodology for Optical Flow"; In Proc. Eleventh IEEE International Conference on Computer Vision (ICCV 2007), Rio de Janeiro, Brazil, Oct. 2007; vol. 92; No. 1; 2011; pp. 1-31.
Baker et al; "A Database and Evaluation Methodology for Optical Flow"; In Proc. Eleventh IEEE International Conference on Computer Vision (ICCV 2007), Rio de Janeiro, Brazil, Oct. 2007; pp. 1-8.
Blender Foundation; Cycles Rendering Engine; (https://web.archive.org/web/20200211040726/https://www.cycles-renderer.org/); pp. 1-2.
Blender.org—Home of the Blender project—Free and Open 3D Creation Software; https://web.archive.org/web/20200226104910/https://www.blender.org/; pp. 1-21.
Brox et al; "High Accuracy Optical Flow Estimation Based on a Theory for Warping"; Lecture Notes in Computer Science; vol. 3024; 2004; pp. 25-36.
Brox et al; "Large Displacement Optical Flow: Descriptor Matching in Variational Motion Estimation"; EEE Transactions On Pattern Analysis And Machine Intelligence; vol. 33; No. 3; 2010; pp. 500-513.
Butler et al; "A Naturalistic Open Source Movie for Optical Flow Evaluation"; In European Conf. on Computer Vision; Oct. 2012; pp. 611-625.
Campello et al; "Hierarchical Density Estimates for Data Clustering, Visualization, and Outlier Detection"; ACM Transactions on Knowledge Discovery from Data; vol. 10; No. 1; Jul. 2015; pp. 1-51.
Chen et al; "Full Flow: Optical Flow Estimation By Global Optimization over Regular Grids"; In Proceedings of the IEEE Conference computer vision and pattern recognition; 2017; pp. 4706-4714.
Chen et al; "MaskLab: Instance Segmentation by Refining Object Detection with Semantic and Direction Features"; In Proceedings of IEEE Conference on Computer Vision and Pattern Recognition; 2018; pp. 4013-4022.
Chen et al; "TensorMask: A Foundation for Dense Object Segmentation"; In Proceedings of the IEEE Conference on Computer Vision; 2019; pp. 1-12.
Deng et al; "ArcFace: Additive Angular Margin Loss for Deep Face Recognition"; In Proceedings of the IEEE Conference on Computer of Vision and Pattern Recognition; 2019; pp. 1-11.
Dosovitskiy; "FlowNet: Learning Optical Flow with Convolutional Networks"; Proceedings of the IEEE International conference on computer vision; 2015; pp. 2758-2766.
Ester et al; "A Density-based Algorithm for Discovering Clusters in Large Spatial Databases with Noise"; In International Conference on Knowledge Discovery and Data Mining; 1996; pp. 221-231.

Geiger et al; "Are we ready for Autonomous Driving? The KITTI Vision Benchmark Suite"; In Conference on Computer Vision and Pattern Recognition; 2012; pp. 1-8.
Girshick; "Fast R-CNN"; arXiv:1504.08083v2 [cs.CV] Sep. 27, 2015; pp. 1-9.
Gkioxari et al; "Mask R-CNN"; Proceedings of the IEEE International conference on computer vision; 2017; pp. 2961-2969.
Horn et al; "Determining Optical Flow"; Artificial Intelligence; vol. 17; No. 1-3; 1981; pp. 185-203.
Huang et al; "Mask Scoring R-CNN"; In the IEEE Conference on Computer Vision and pattern Recognition; Jun. 2019; pp. 1-10.
Hui et al; "LiteFlowNet: A Lightweight Convolutional Neural Network for Optical Flow Estimation"; Proceedings of the IEEE Conference on Computer Vision and Pattern Recognition; 2018; pp. 1-11.
Hur et al; "Iterative Residual Refinement for Joint Optical Flow and Occlusion Estimation"; IEEE Conference on Computer Vision and Pattern Recognition; 2019; pp. 1-15.
Iig et al; "FlowNet 2.0: Evolution of Optical Flow Estimation with Deep Networks"; Proceedings of the IEEE Conference on computer vision and patter recognition; 2017; pp. 2462-2470.
Jaderberg et al; "Spatial Transformer Networks"; arXiv:1506.02025v3 [cs.CV]; 2015; pp. 1-9.
Kuznetsova et al; "The Open Images Dataset V4: Unified image classification, object detection, and visual relationship detection at scale"; arXiv:1811.00982v2 [cs.CV] Feb. 21, 2020; 201; 2018; pp. 1-26.
Lin et al; "Feature Pyramid Networks for Object Detection"; IEEE Conference on Computer Vision and Pattern Recognition; 2017; pp. 2117-2125.
Liu et al; "Path Aggregation Network for Instance Segmentation"; In Proceedings of the IEEE Conference on Computer Vision and Pattern Recognition; 2018 pp. 8759-8768.
Liu et al; "SelFlow: Self-Supervised Learning of Optical Flow"; 2019; pp. 1-14.
Liu et al; "SGN: Sequential Grouping Networks for Instance Segmentation"; In Proceedings of the IEEE International Conference on Computer Vision; 2017; pp. 3496-3504.
Lucas et al; "An Iterative Image Registration Technique with an Application to Stereo Vision"; 1981; pp. 674-679.
Maurer et al; "PROFLOW: Learning to Predict Optical Flow"; 2018; pp. 1-16.
Mayer et al; "A Large Dataset to Train Convolutional Networks for Disparity, Optical Flow, and Scene Flow Estimation"; IEEE International Conference on Computer Vision and Pattern Recognition; arXiv:1512.02134v1; 2016; pp. 1-14.
Meister et al; "UnFlow: Unsupervised Learning of Optical Flow with a Bidirectional Census Loss"; Thirty-Second AAAI Conference on Artificial Intelligence; 2018; pp. 1-9.
Menze et al; "Object Scene Flow for Autonomous Vehicles"; In Conference on Computer Vision and Pattern Recognition; 2015; pp. 1-10.
Neoral et al; "Continual Occlusions and Optical Flow Flow Estimation"; Asian Conference on Computer Vision; 2018; pp. 159-174.
Ranjan et al; "Optical Flow Estimation using a Spatial Pyramid Network"; Proceedings of the IEEE Conference on Computer Vision and Pattern Recognition; 2017; pp. 4161-4170.
Ren et al; "A Fusion Approach for Multi-Frame Optical Flow Estimation"; Proceedings of the IEEE Winter Conference on Applications of Computer Vision; 2019; pp. 1-10.
Ren et al; "End-to-End Instance Segmentation with Recurrent Attention"; In Proceedings of the IEEE Conference on Computer Vision and Pattern Recognition; 2017; pp. 1-12.
Ren et al; "Faster R-CNN: Towards Real-Time Object Detection with Region Proposal Networks"; In Advances in neural information processing systems; 2015; pp. 1-14.
Revaud et al; "EpicFlow: Edge-Preserving Interpolation of Correspondences for Optical Flow"; Proceedings of the IEEE Conference on Interpolation of Correspondences for Optical Flow; 2015; pp. 1-11.
Schroff et al; "FaceNet: A Unified Embedding for Face Recognition and Clustering"; In Proceedings of the IEEE Conference on computer vision and face recognition and clustering; 2015; pp. 1-10.

(56) References Cited

OTHER PUBLICATIONS

Song et al; "Efficient Coarse-to-Fine PatchMatch for Large Displacement Optical Flow"; IEEE Conference on Computer Vision and Pattern Recognition; 2016 pp. 5704-5712.
Sun et al; "Models Matter, So Does Training: An Empirical Empirical Study of CNNs for Optical Flow Estimation"; IEEE Transactions on Pattern Analysis and Machine Intelligence; 2019; pp. 1-15.
Sun et al; "PWC-Net: CNNs for Optical Flow Using Pyramid, Warping, and Cost Volume"; In the Proceedings of the IEEE Conference on Computer Vision and Pattern Recognition; 2018; pp. 1-18.
Thorndike; Who belongs in the Family; Psychometrika; vol. 18; No. 4; Dec. 1953; pp. 1-10.
Uhrig et al; "Pixel-level Encoding and Depth Layering for Instance-level Semantic Labeling"; In German Conference on Pattern Recognition; 2016; pp. 14-25.
Wang et al; "Occlusion Aware Unsupervised Learning of Optical Flow"; In Proceedings of the IEEE Conference on Computer Vision and Pattern Recognition; 2018; pp. 4884-4893.
Wulff et al; "Efficient Sparse-to-Dense Optical Flow Estimation using a Learned Basis and Layers"; In Proceedings of the IEEE Conference on Computer Vision and Pattern Recognition; 2015; pp. 1-11.
Wulff et al; "Optical Flow in Mostly Rigid Scenes"; In Proceedings of the IEEE Conference on Computer Vision and Pattern Recognition; 2017; pp. 1-15.
Xu et al; "Accurate Optical Flow via Direct Cost Volume Processing"; Proceedings of the IEEE Conference on Computer Vision and Pattern Recognition; 2017; pp. 1289-1297.

\* cited by examiner

ANALYSING OBJECTS IN A SET OF FRAMES

BACKGROUND

Analysing the behaviour of objects between frames is a task that arises repeatedly in vision applications. In particular, it is often desirable to estimate the motion of one or more objects in a scene between a first frame and a second frame.

The goal of motion estimation is to determine how pixels move from a reference frame to a target frame. Several methods have been proposed to solve this task, some of which use Deep Neural Networks (DNNs). Early DNN-based methods for motion estimation such as FlowNet struggled to compete with well-developed classical methods, however recently there has been a significant improvement in their performance. State of the art DNN-based methods including PWC-Net (D. Sun, X. Yang, M.-Y. Liu, and J. Kautz, "Pwc-net: Cnns for optical flow using pyramid, warping, and cost volume," in Proceedings of the IEEE Conference on Computer Vision and Pattern Recognition, 2018, pp. 8934-8943) have begun to outperform classical methods both in terms of computational efficiency and accuracy. DNN-based methods represent a new way of thinking about the problem of motion estimation, and have been gradually improving over time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of analysing objects in a first frame and a second frame is disclosed. The method includes segmenting the frames, and matching at least one object in the first frame with a corresponding object in the second frame. The method optionally includes estimating the motion of the at least one matched object between the frames. Also disclosed is a method of generating a training dataset suitable for training machine learning algorithms to estimate the motion of objects. Also provided are processing systems configured to carry out these methods.

According to a first aspect, there is provided a method of analyzing one or more objects in a set of frames comprising at least a first frame and a second frame, the method comprising:
  segmenting the first frame, to produce a plurality of first masks, each first mask identifying pixels belonging to a potential object-instance detected in the first frame;
  for each potential object-instance detected in the first frame, extracting from the first frame a first feature vector characterising the potential object-instance;
  segmenting the second frame, to produce a plurality of second masks, each second mask identifying pixels belonging to a potential object-instance detected in the second frame;
  for each potential object-instance detected in the second frame, extracting from the second frame a second feature vector characterising the potential object-instance; and
  matching at least one of the potential object-instances in the first frame with one of the potential object-instances in the second frame, based at least in part on the first feature vectors, the first masks, the second feature vectors and the second masks.

Each potential object-instance may be present in a respective region of interest of the frame, the region of interest being defined by a bounding box.

Segmenting the first frame to produce the first masks may comprise: identifying the regions of interest in the first frame and, for each region of interest, segmenting pixels within the associated bounding box to produce the respective first mask; and segmenting the second frame to produce the second masks may comprise: identifying the regions of interest in the second frame and, for each region of interest, segmenting pixels within the associated bounding box to produce the respective second mask.

The segmenting for each potential object-instance may be based only on those pixels within the bounding box. The segmenting may further comprise refining the bounding box. The bounding box may be generated, and later refined, using a machine learning algorithm.

The matching may comprise clustering the potential object-instances detected in the first and second frames, based at least in part on the first feature vectors and the second feature vectors, to generate clusters of potential object-instances.

The matching may further comprise, for each cluster in each frame: evaluating a distance between the potential object-instances in the cluster in that frame; and splitting the cluster into multiple clusters based on a result of the evaluating. The splitting into multiple clusters may be based on a k-means clustering algorithm. The parameter k in the algorithm may be determined using an elbow method.

Evaluating the distance between the potential object-instances in the cluster may comprise assigning the potential object-instances in the cluster to two or more sub-groups; determining a centroid of each group based on the first/second feature vectors, and evaluating a distance between the centroids. The evaluating may comprise determining whether the distance between the centroids of the sub-groups would be decreased by splitting. Splitting the cluster may comprise defining the multiple clusters based on the sub-groups.

The matching may comprise selecting a single object-instance from among the potential object-instances in each cluster in each frame.

The selecting is performed after the clustering. It may be performed after the splitting.

The matching may comprise matching at least one of the single object-instances in the first frame with a single object-instance in the second frame.

The matching may comprise evaluating differences between the single object-instances in each frame; identifying the pair of single object instances having the lowest difference between them; and matching this pair of single object instances. This may be performed repeatedly, to match multiple pairs of single object-instances between the two frames.

The differences may be evaluated based on the respective feature vectors associated with the single object-instances.

The matching may comprise rejecting potential object-instances based any one or any combination of two or more of the following: an object confidence score, which estimates whether a potential object-instance is more likely to be an object or part of the background; a mask confidence score, which estimates a likelihood that a mask represents an object; and a mask area.

Potential object-instances may be rejected if their object confidence score, mask confidence score, or mask area is below a respective predetermined threshold. All three of these parameters may be evaluated for each potential object-instance and the potential object-instance may be rejected if any one of them falls below the respective threshold.

As well as—or instead of—rejecting potential object-instances, the same criteria may be used for selecting a single object-instance for each cluster, as discussed above. For example, a single object-instance may be selected that has the highest score based on any one, or two or more of: the object confidence score, the mask confidence score, and the mask area.

The mask confidence score may be based at least in part on the mask for the potential object-instance. Alternatively or in addition, it may be based at least in part on features extracted from the region of interest that is associated with the potential object-instance.

The mask area may be determined by the number of active pixels in the mask.

The rejecting may be performed after the clustering. The rejecting may be performed before the splitting. The rejecting may be performed before the selecting.

The mask confidence score may be generated by a machine learning algorithm trained to predict a degree of correspondence between the mask and a ground truth mask. The degree of correspondence may comprise the intersection over union of the mask and the ground truth mask.

The masks and feature vectors may be generated by a first machine learning algorithm. The masks may be generated by one head of the first machine learning algorithm; the feature vectors may be generated by another head of the machine learning algorithm. The mask confidence and/or object confidence scores may also be generated by further heads of the first machine learning algorithm. Thus, the object confidence score for each potential object-instance, as summarised above, may be based at least in part on an output of the first machine learning algorithm. The bounding box for each object-instance may be generated by the first machine learning algorithm. The bounding box for a given object-instance may be refined by one head of the first machine learning algorithm while the respective mask is generated by another head of the first machine learning algorithm.

The method may further comprise, for at least one matched object in the first frame and the second frame, estimating a motion of the object between the first frame and the second frame. Estimating the motion of the object may comprise, for each of a plurality of pixels of the object: estimating a translational motion vector; estimating a non-translational motion vector; and calculating a motion vector of the pixel as the sum of the translational motion vector and the non-translational motion vector.

The translational motion vector may be estimated based at least in part based on a centroid of the mask in the first frame and a centroid of the corresponding matched mask in the second frame. Alternatively, the translational motion vector may be estimated at least in part based on a centre of the bounding box in the first frame and a centre of the corresponding bounding box in the second frame. The non-translational motion vector may describe rotation and/or perspective transformation.

Estimating the motion of the object optionally comprises: generating a coarse estimate of the motion based at least in part on the mask in the first frame and the corresponding matched mask in the second frame; and refining the coarse estimate using a second machine learning algorithm, wherein the second machine learning algorithm takes as input the first frame, the second frame, and the coarse estimate, and the second machine learning algorithm is trained to predict a motion difference between the coarse motion vector and a ground truth motion vector.

In some embodiments, the coarse estimate may be a coarse estimate of the translational motion-vector for each pixel. In this case, the motion difference may represent the non-translational motion vector (and may optionally also represent a refinement of the translational motion-vector). In some embodiments, the coarse estimate may include a coarse estimate of the translational motion-vector and a coarse estimate of the non-translational motion vector. In this case, the motion difference may represent a refinement of the translational motion-vector and the non-translational motion-vector). The coarse estimate of the non-translational motion-vector may be generated by a further head of the first machine learning algorithm. In either case, the motion difference may also represent a motion of the background.

The second machine learning algorithm may be trained to predict the motion difference at a plurality of resolutions, starting with the lowest resolution and predicting the motion difference at successively higher resolutions based on upsampling the motion difference from the preceding resolution.

According to a further aspect, there is provided a method of generating a training dataset for training a machine learning algorithm to perform motion estimation, the method comprising:
  obtaining a plurality of images of objects;
  obtaining a plurality of images of backgrounds; and
  generating a plurality of pairs of synthetic images, each pair comprising a first frame and a second frame,
  the first frame comprising a selection of objects in first positions and first orientations superimposed on a selected background,
  the second frame comprising the selection of objects in second positions and second orientations superimposed on the selected background, wherein at least some of the second positions and second orientations are different from the first positions and first orientations,
  the method further comprising generating:
    translational ground truth motion vectors, describing the difference between the first positions and the second positions; and
    non-translational ground truth motion vectors, describing the difference between the first orientations and the second orientations.

The method may further comprise, for some of the pairs of synthetic images, using the images of the objects directly as obtained; and, for other pairs of synthetic images, modifying the images of the objects before superimposing them on the background. Modifying the images may comprise applying to one object the appearance of another object (also known as texturing or texture-mapping).

The method may further comprise, before generating the plurality of pairs of synthetic images, rejecting some of the obtained plurality of images of objects. The rejecting optionally comprises one or more of: rejecting images that contain more than a first predetermined number of faces; rejecting images that contain fewer than a second predetermined number of faces; and rejecting objects that comprise multiple disjoint parts.

The translational ground truth motion vectors may include motion vectors meeting at least one of the following conditions: a horizontal component of the motion vector is at least 20%, optionally at least 50%, or at least 70% of the width of the first frame; and a vertical component of the motion vector is at least 20%, optionally at least 50%, or at least 70% of the height of the first frame.

The method may further comprise dividing the plurality of pairs of images into a training set, for training the machine learning algorithm and a test set, for testing the performance of the machine learning algorithm.

Each first frame may be generated by selecting objects at random and positioning them randomly in the first positions. Alternatively or in addition, the differences between the first positions and the second positions may be selected randomly.

The method may further comprise rendering at least one of: a translational flow field, containing a flow field derived from the translational ground truth motion vectors; and a combined flow field, containing a flow field derived from the translational ground truth motion vectors and the non-translational ground truth motion vectors.

Also provided is an image processing system, comprising:
a memory, configured to store a set of frames comprising at least a first frame and a second frame; and
a first segmentation block, configured to segment the first frame, to produce a plurality of first masks, each first mask identifying pixels belonging to a potential object-instance detected in the first frame;
a first feature extraction block, configured to, for each potential object-instance detected in the first frame, extract from the first frame a first feature vector characterising the potential object-instance;
a second segmentation block, configured to segment the second frame, to produce a plurality of second masks, each second mask identifying pixels belonging to a potential object-instance detected in the second frame;
a second feature extraction block, configured to, for each potential object-instance detected in the second frame, extract from the second frame a second feature vector characterising the potential object-instance; and
a matching block, configured to match at least one of the potential object-instances in the first frame with one of the potential object-instances in the second frame, based at least in part on the first feature vectors, the first masks, the second feature vectors and the second masks.

In some embodiments, the first and second segmentation blocks may be provided by one block, configured to segment both frames. Similarly, in some embodiments, the first and second feature extraction blocks may be provided by one block, configured to extract feature vectors for the potential object-instances in both frames. Alternatively, the respective first and second blocks may be separate blocks. This may facilitate parallel processing of the first frame and the second frame, for example. The system may further comprise a motion estimation block, configured to estimate the motion of objects matched by the matching block.

Also disclosed is a processing system configured to perform a method as summarised above or according to any of claims 1 to 12. The processing system may be a graphics processing system or an artificial intelligence accelerator system. The processing system may be embodied in hardware on an integrated circuit.

Also disclosed is a method of manufacturing, using an integrated circuit manufacturing system, a processing system as summarised above or as claimed in any of claims 13 to 18.

Also disclosed is a method of manufacturing, using an integrated circuit manufacturing system, a processing system as summarised above, the method comprising:
processing, using a layout processing system, a computer readable description of the processing system so as to generate a circuit layout description of an integrated circuit embodying the processing system; and
manufacturing, using an integrated circuit generation system, the processing system according to the circuit layout description.

Also disclosed is computer readable code configured to cause a method as summarised above to be performed when the code is run. Also disclosed is a computer readable storage medium having encoded thereon the computer readable code. The computer readable storage medium may be a non-transitory computer readable storage medium.

Also disclosed is a non-transitory computer readable storage medium having stored thereon a computer readable description of a processing system summarised above, which, when processed in an integrated circuit manufacturing system, causes the integrated circuit manufacturing system to:
process, using a layout processing system, the computer readable description of the processing system so as to generate a circuit layout description of an integrated circuit embodying the processing system; and
manufacture, using an integrated circuit generation system, the processing system according to the circuit layout description.

Also disclosed is an integrated circuit manufacturing system comprising:
a non-transitory computer readable storage medium having stored thereon a computer readable description of a processing system as summarised above;
a layout processing system configured to process the computer readable description so as to generate a circuit layout description of an integrated circuit embodying the processing system; and
an integrated circuit generation system configured to manufacture the processing system according to the circuit layout description.

The layout processing system may be configured to determine positional information for logical components of a circuit derived from the computer readable description so as to generate a circuit layout description of an integrated circuit embodying the processing system.

The processing system may be embodied in hardware on an integrated circuit. There may be provided a method of manufacturing, at an integrated circuit manufacturing system, a processing system. There may be provided an integrated circuit definition dataset that, when processed in an integrated circuit manufacturing system, configures the system to manufacture a processing system. There may be provided a non-transitory computer readable storage medium having stored thereon a computer readable description of a processing system that, when processed in an integrated circuit manufacturing system, causes the integrated circuit manufacturing system to manufacture an integrated circuit embodying a processing system.

There may be provided an integrated circuit manufacturing system comprising: a non-transitory computer readable storage medium having stored thereon a computer readable description of the processing system; a layout processing system configured to process the computer readable description so as to generate a circuit layout description of an integrated circuit embodying the processing system; and an integrated circuit generation system configured to manufacture the processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
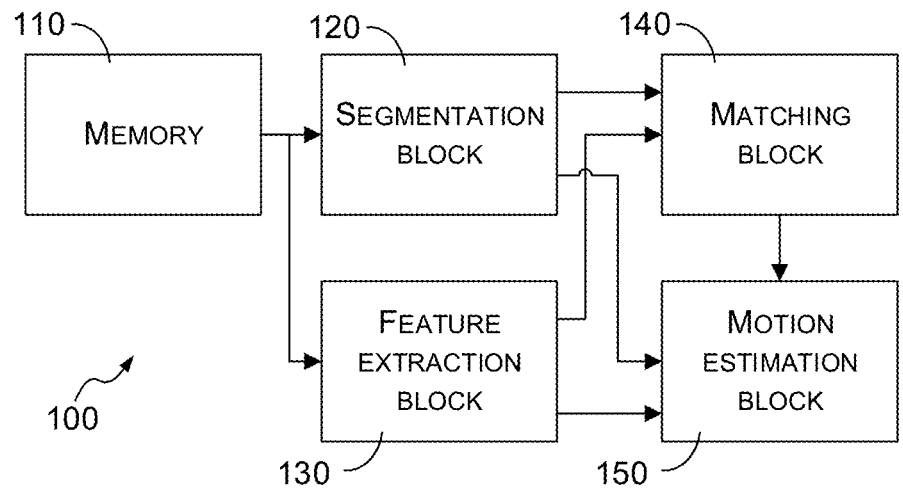
FIG. 1 shows a block diagram of a processing system according to an embodiment.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Definitions

"Mask", as used herein, means a pixel map indicating the location of an object. A mask may be binary. In a binary mask, each pixel that is marked as active denotes the presence of the object at that pixel. Each pixel that is marked as inactive denotes the absence of the object at that pixel.

The centroid of a mask, as used herein, refers to the mean location of the active pixels in the mask.

The present inventors have recognised that current state-of-the-art DNN-based motion estimation approaches still struggle in challenging cases where objects undergo severe variation in their appearance. They also typically struggle where small objects move a long distance between the two frames—that is, small, fast-moving objects. In these cases, the translation of the object in the field of view of the frame might fall outside the limited spatial range of a DNN-based method. However, humans are often still able to understand the motion occurring in such examples, due to their ability to apply a higher-level understanding of the objects in the scene. The inventors have further recognised that by identifying objects and matching them between the two frames, it is possible to resolve these challenging cases.

Although pyramid-based techniques such as PWC-Net extract representations at multiple levels for each square block of the input image, they do not generate object-level representations for each object. Object-level representations may also be more expressive when an object undergoes complex motion or a (non-rigid) object undergoes severe deformation.

FIG. 1 is a block diagram showing an image processing system 100 configured to analyse objects and estimate their motion, according to one embodiment. The system comprises a memory 110, configured to store a set of frames including at least a first frame and a second frame. These two frames are also referred to herein as the reference frame and the target frame. The system further comprises a segmentation block 120, configured to segment the frames and produce a plurality of masks for each frame. Each mask identifies the location of a potential object-instance in one of the frames. In this context, an object-instance is an occurrence of an object in a particular frame. A 'potential' object-instance is a possible object-instance that may or may not be rejected at a later time, according to predetermined criteria. The system 100 further comprises a feature extraction block 130, configured to extract a feature vector for each potential object-instance; a matching block 140, configured to match potential object-instances between the frames; and a motion estimation block 150, configured to estimate the motion of the matched objects.

Figure 2:
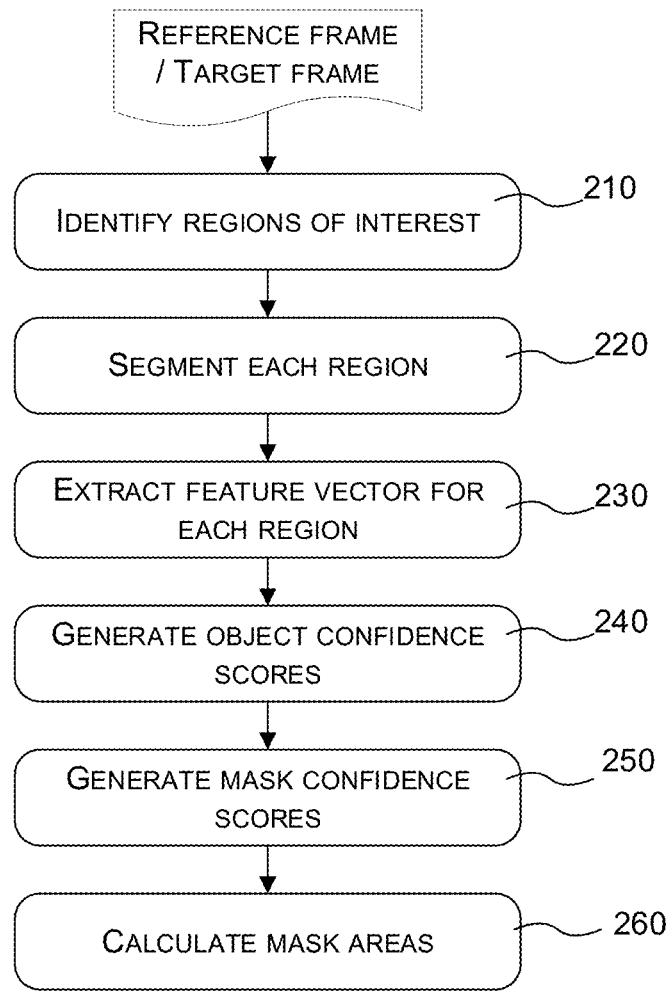
FIG. 2 is a flowchart illustrating part of a method of object analysis according to an embodiment

FIG. 2 is a flowchart illustrating an object analysis method according to an embodiment. The input to the method comprises the first and second frames stored in the memory 110. In steps 210 and 220, the segmentation block 120 segments the first frame to produce a plurality of first masks. This is done in two parts. In step 210, the segmentation block 120 identifies regions of interest in the first frame. Each region of interest is defined by a bounding box. In step 220, for each region of interest, the segmentation block 120 segments pixels in the respective bounding box, to produce the respective first mask. In the present example, the regions of interest are identified using a Region Proposal Network (RPN), which is a neural network trained to identify potential object-instances. The RPN used in Mask R-CNN (K. He, G. Gkioxari, P. Dollar, and R. Girshick, "Mask r-cnn," in Proceedings of the IEEE international conference on computer vision, 2017, pp. 2961-2969) has been found to produce good results, but other region proposal networks may be used in its place. The mask is generated by a part of the same neural network. The segmentation process will be described in detail below with reference to FIG. 5. Steps 210 and 220 are repeated, by the segmentation block 120, for the second frame, which is segmented to produce a plurality of second masks.

In this way, the segmentation block 120 achieves instance segmentation of both the first frame and the second frame. Instance segmentation is the problem of identifying instances of objects within an image, and providing a segmentation for each. It may be differentiated from object detection, which does not proceed any further than identifying a bounding box around each object instance. It may also be differentiated from semantic segmentation, in which each pixel is assigned to classes of objects or background, but there is no separation of the different instances of the object-classes from one another. Without wishing to be bound by theory, it is believed that the use of instance segmentation is at least in part responsible for the good performance of the present method.

In step 230, for each potential object-instance identified in the first frame, the feature extraction block 130 extracts from the first frame a first feature vector characterising that potential object-instance. In general, a feature vector is an abstract representation of an object instance, either extracted from a frame or—as in the present example—extracted from a feature map derived from a frame. In the present example, the feature vector is extracted by a further head of the same neural network that identifies the bounding boxes and generates the masks. In other words, in the present example, the neural networks that perform these tasks share a common ("backbone") portion. An identical feature extraction process 230 is performed by the feature extraction block 130 also for the second frame.

Other tasks are performed by other heads of the neural network. In the present description, these tasks are assigned to the feature extraction block 130; however, they could alternatively be assigned to some other block. In step 240, the feature extraction block 130 generates an object confidence score, which predicts whether the respective potential object-instance is likely to represent an object or the background. In the Mask R-CNN algorithm adapted for use in the present example, this object confidence score is known as the "objectness" score. See also: Faster R-CNN (S. Ren, K. He, R. Girshick, and J. Sun, "Faster r-cnn: Towards real-time object detection with region proposal networks," in Advances in neural information processing systems, 2015, pp. 91-99).

In step 250, the feature extraction block 130 generates a mask confidence score, which predicts whether the respective mask is likely to represent an object. Again, in the present example, this is generated by another head of the neural network. In particular, the head of the neural network that generates the mask confidence score is trained to predict the intersection-over-union (IoU) of masks generated by the mask-generation head with their respective ground truth masks. At inference time this provides an estimate of the accuracy of the masks generated. In the present example, this head of the network takes as input (i) the mask itself and (ii) some of the intermediate features that were used in earlier layers of the network to generate the mask. These inputs are processed by further layers of the neural network to generate the mask confidence score.

In step 260, the feature extraction block 130 calculates the mask area for each first mask and second mask. In particular, it counts the number of active pixels in the respective mask.

Figure 3:
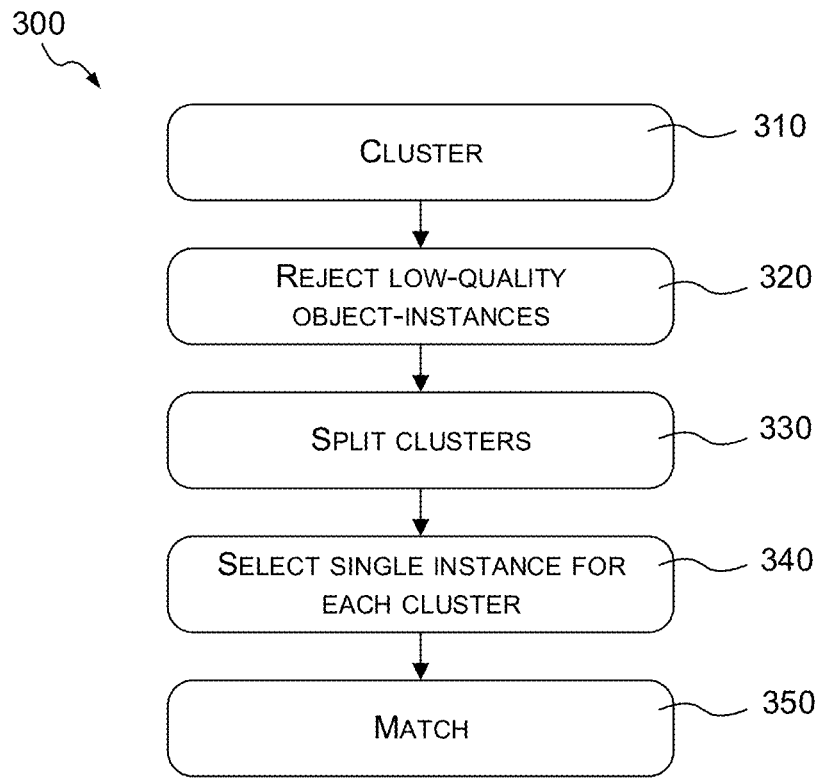
FIG. 3 is a flowchart illustrating an object-matching method according to an embodiment

The pieces of data generated in steps 210-260 can now be used to match object-instances in the first frame with object-instances in the second frame. FIG. 3 illustrates a matching method 300 according to one embodiment. In step 310, the matching block 140 clusters the aggregated set of potential object-instances from the two frames. In the present example, the clustering is based on the HDBScan algorithm (R. J. Campello, D. Moulavi, A. Zimek, and J. Sander, "Hierarchical density estimates for data clustering, visualization, and outlier detection," ACM Transactions on Knowledge Discovery from Data (TKDD), vol. 10, no. 1, p. 5, 2015). The input to the clustering algorithm comprises the feature vectors extracted by the feature extraction block 130 in step 230.

Following the initial clustering of step 310, the method proceeds to step 320, in which object-instances of low quality are rejected by removing them from the clusters. This is done because the region proposal network typically generates an excess of region proposals, and the mask generation may generate multiple masks for each region proposed. Thus, the number of potential object-instances included in the initial clustering is typically considerably greater than the number of actual objects. According to the present embodiment, three criteria are used to reject potential object-instances, in step 320: object-instances whose object confidence score is below a predetermined threshold are removed; object-instances whose mask confidence score is below a predetermined threshold are removed; and object instances whose mask area is below a predetermined threshold are removed. Of course, in other embodiments fewer criteria and/or other criteria, may be used.

In step 330, the matching block 140 splits apart clusters that are not sufficiently coherent. In the present example, this is done by assigning the object-instances in a cluster to two or more sub-groups; determining the centroid of each sub-group in the feature-space (that is, the centroid of the feature vectors for the object-instances making up the sub-group); evaluating the Euclidean distance between the sub-group centroids; and splitting the cluster into smaller clusters if this would significantly reduce the Euclidean distance between the sub-group centroids without increasing the number of clusters too much. More specifically, the feature vectors in the original cluster are input to a k-means clustering algorithm (well known to those skilled in the art) to find a set of smaller clusters for the data. The number, k, of clusters is determined using the elbow method (e.g see R. L. Thorndike, "Who belongs in the family," in Psychometrika, 1953).

Next, in step 340, the matching block 140 selects a single object-instance from each cluster present in each frame after step 330. This may be done using a variety of criteria. In the present example, the potential object-instance having the largest mask area in a cluster is selected. The result of this step is a number of single object-instances in each frame. In general, there may be different numbers of objects in the two frames—for example, because of objects arriving or leaving between the frames, or because of false positive or false negatives in the instance segmentation. In step 350, the matching block 140 matches the single object-instances between the two frames. In the present example, this is done by a "greedy" algorithm. In other words, the pairwise distances between the feature vectors of the single object-instances are evaluated. The pair with the lowest distance is selected as the first match. From the remaining single object-instances, the pair with the next lowest distance is selected as the second match, and so on until all the single object-instances in at least one of the two frames have been matched. After step 350 is completed, the method has identified a set of pairwise matches between objects in the first frame and object in the second frame. This provides a useful input to the motion estimation algorithm 400.

Figure 4:
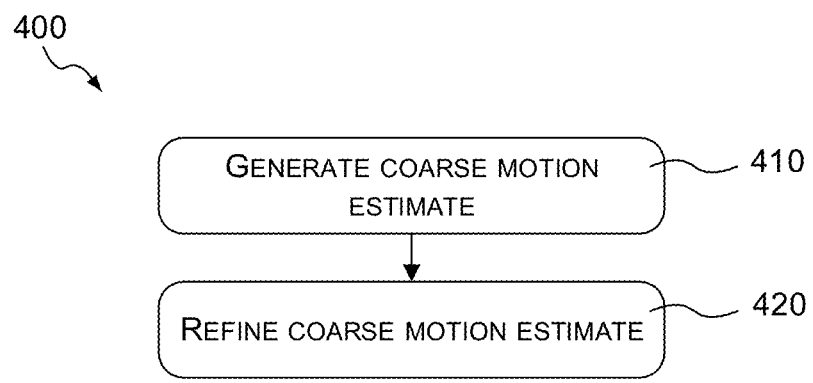
FIG. 4 is a flowchart illustrating a motion estimation method according to an embodiment

FIG. 4 is a flowchart illustrating a motion estimation method 400 according to an embodiment. In step 410, the motion estimation block 150 generates a coarse motion estimate for each object. In the present embodiment, this comprises calculating a translational motion vector between the centroid of each mask in the first frame and the centroid of each matching mask in the second frame. In other words, the coarse estimate is based on the motion of the object centroid. Other approaches are of course possible. For example, the coarse estimate could be based on the centroid of the bounding box rather than the centroid of the mask.

In step 420, the motion estimation block 150 refines the coarse estimate using a second neural network. In particular, the input to the second neural network comprises the first and second frames, and the coarse estimate. The second neural network is trained to predict a motion difference between the coarse motion vectors and ground-truth motion vectors. In this way, the second neural network estimates the non-translational part of each motion vector. In the process, the second neural network may also refine the translational part of each motion vector. In the present embodiment, the second neural network is trained to predict the motion difference at a plurality of resolutions, starting with the lowest resolution and proceeding to successively higher resolutions. The coarse motion estimate is used as input for the lower resolutions only. At the higher resolutions, the neural network estimates the motion vectors based on the refined estimates from the lower resolutions.

The algorithm outlined above has been found to produce good performance in practical experiments. Without wishing to be bound by theory, it is believed that the object-matching method allows the algorithm to cope with long-range motion, even for small objects. The refinement using the neural-network-based motion estimation exploits the increased accuracy of which these state-of-the-art motion estimation algorithms are capable. In other words, the advantages of the two methods complement one another, to produce better results than either would be capable of alone. Each method helps to compensate for the limitations of the other.

Many variations to the above-described algorithm are possible. For example, in one alternative embodiment, the coarse motion vector estimate includes an estimate of the non-translational motion vectors as well as an estimate of the translational motion vectors. The coarse non-translational motion vectors may be generated by an additional head of the first neural network described above (that is, the neural network responsible for segmentation and feature extraction). This may help to remove some of the burden from the second neural network, by providing it with an initial estimate not only of the translational component but also of the non-translational component of the motion vectors.

In other variants, some of the steps may be performed in a different order. For example, the step of rejecting potential object-instances could be performed before the step of clustering or after the step of splitting clusters. Also, as noted already above, the different pieces of data produced in the segmentation and feature extraction stage may be produced in a different order from that indicated in FIG. 2. In particular, the different pieces of data may be produced by different heads of the same neural network. Thus, they may be produced in any order, or indeed in parallel.

As mentioned already above, some of the functionality of the different blocks shown in FIG. 1 may be shared—in particular, where the different blocks produce data from different heads of the same backbone neural network. The functionality of the blocks in FIG. 1 may be implemented by one or more general-purpose processors, or one or more graphics processing units (GPUs). The neural network processing, in particular, is implemented by one or more neural network accelerators (NNAs).

A method and system for object matching and motion estimation according to an embodiment will now be described in detail, with reference to FIGS. 5 and 6. It will be understood that this embodiment is merely exemplary and the scope of the present disclosure is in no way limited to it.

To estimate a motion field D describing the displacement from a reference frame to a target frame, the problem is separated into two parts. First, the rough estimation of the translation-only motion $\hat{D}_t$, which contains only the translation component of the motion of each object in the scene. Second, the completion and refinement of $\hat{D}_t$, which means the estimation of the background motion $\hat{D}_b$, as well as the rotational motion of each object $\hat{D}_r$. More specifically, at each object pixel, $\hat{D}_t$ is equal to the displacement, between frames, of the centre of the bounding box enclosing the object at that pixel. $\hat{D}_r$ is the 2D displacement from the reference frame to the target frame relative to the centre of the enclosing bounding box in each image. Note that $\hat{D}_t$ is constant within each object in the image, whereas $\hat{D}_r$ varies within each object and accounts for both rotation of the object and perspective projection. The refinement and completion of the estimated motion field in the second part is achieved through a latter network G, giving the final flow $\hat{D}=G(\hat{D}_t)$.

$\hat{D}_t$ is found by training a modified version of Mask R-CNN. This identifies (potential) object instances $j \in 1, \ldots, N$, where N is unknown, in the first frame $I_1$ and the second frame $I_2$, and calculates a bounding box, $bb_j$, a binary mask, $M_j$, an objectness score, $O_j$, a mask confidence score, $S_j$, and a representative feature vector, $F_j$, for each object instance. Objects are matched between the two frames based on the feature vectors, masks and scores. The offsets between the masks in the reference frame and their matched corresponding mask in the target frame are then used to generate $\hat{D}_t$.

Figure 5:
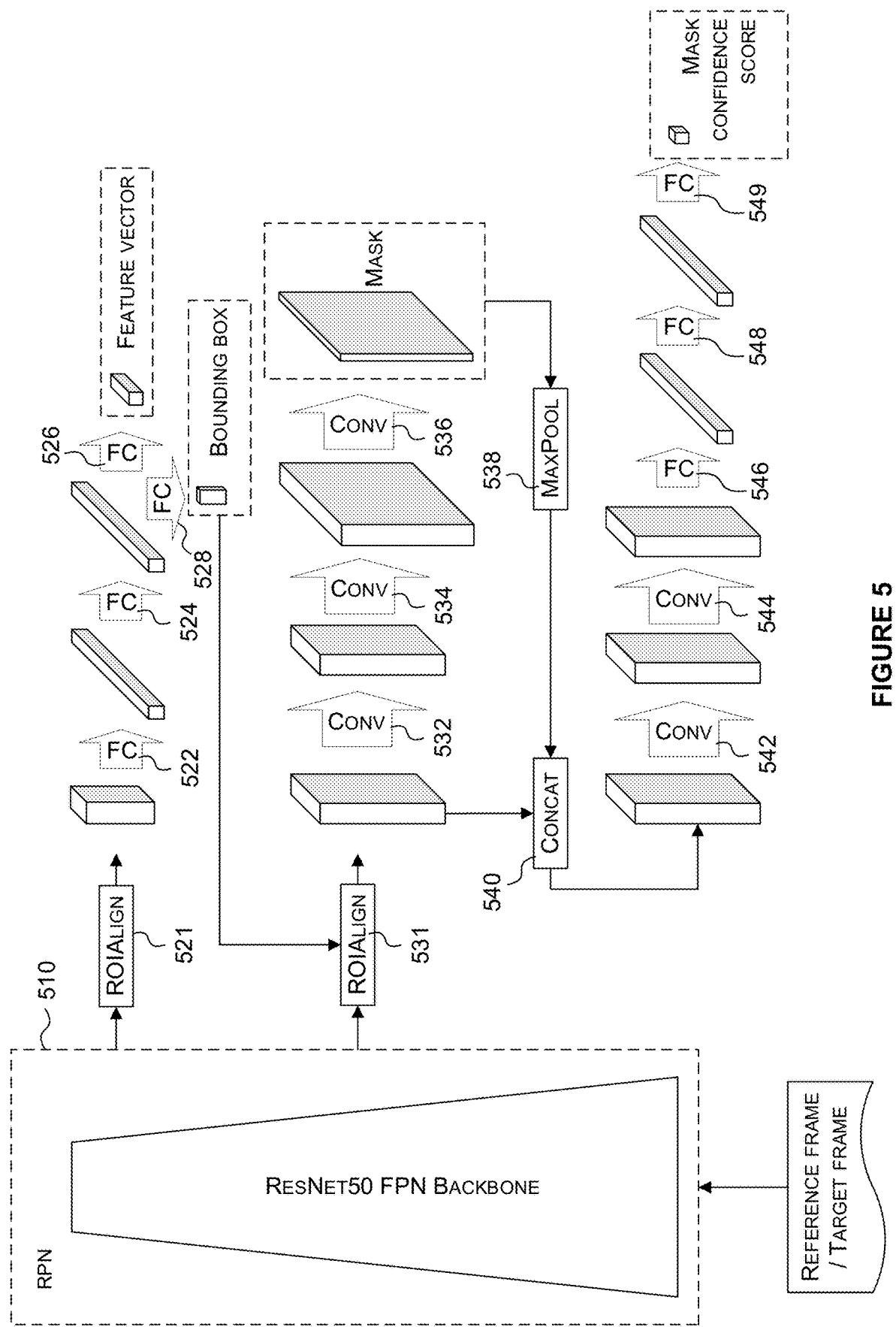
FIG. 5 illustrates an instance segmentation method using a neural network, according to an embodiment.

FIG. 5 illustrates an instance segmentation method according to an embodiment. This embodiment uses a modified version of the Mask R-CNN algorithm. In FIG. 5, the block arrows marked "Cony" denote convolutional layers of the neural network. The blocks arrows marked "FC" denote fully connected layers. The first and second frames are input to a set of layers denoted as the backbone part 510 of the neural network. In the present example, the backbone part 510 consists of the Region Proposal Network (RPN) component of Mask R-CNN (this embodiment uses the ResNet50 FPN version) (K. He, G. Gkioxari, P. Dollar, and R. Girshick, "Mask r-cnn," in Proceedings of the IEEE international conference on computer vision, 2017, pp. 2961-2969). The backbone part 510 of the network uses a Feature Pyramid Network (FPN), which generates a pyramid of feature maps of different spatial resolutions, from fine to coarse. The backbone part 510 (RPN) also outputs a coarse estimate of the bounding box for each potential object instance. Further details of the FPN, can be found in Tsung-Yi Lin, Piotr Dollár, Ross Girshick, Kaiming He, Bharath Hariharan, Serge Belongie, "Feature Pyramid Networks for Object Detection", IEEE Conference on Computer Vision and Pattern Recognition (CVPR), 2017, pp. 2117-2125.

The feature maps extracted by the backbone part 510 of the network are input to two heads of the network with different functions. A first head, consisting of an ROIAlign process 521, and fully connected layers 522, 524, 526 and 528, generates the feature vector and a refined bounding box for each potential object-instance. A second head, consisting of ROIAlign process 531, convolutional layers 532, 534, 536, 542 and 544, max-pooling layer 538, concatenation operation 540, and fully connected layers 546, 548 and 549, generates the mask and mask confidence score for each potential object-instance. Each ROIAlign process 521, 531 receives as input: (i) a bounding box for each potential object instance; and (ii) the pyramid of feature maps for the whole frame. Each ROIAlign process 521, 531 uses the bounding box for each potential object instance to extract a small feature map of fixed size from the pyramid of feature maps for the whole frame. In the present example, for each potential object instance, an appropriate level of the pyramid is selected, according to the size of the bounding box. Bilinear interpolation is then used to extract the fixed-size feature map for the potential object instance from the feature map at the selected level. In greater detail: the bounding box is used to crop a part of the feature map, at the selected pyramid level. The cropped feature map is then pooled to a fixed-size feature map using bilinear interpolation.

The ROIAlign process 521 of the first head takes as its bounding-box input the coarsely estimated bounding boxes that are generated by the backbone RPN 510. The ROIAlign process 531 of the second head takes as its bounding-box input the refined bounding box coordinates generated by the first head. The data dimensions at each layer of the network, in the current implementation, are shown in Table 1.

The ROIAlign operation used in Mask R-CNN (K. He, G. Gkioxari, P. Dollar, and R. Girshick, "Mask r-cnn," in Proceedings of the IEEE international conference on computer vision, 2017, pp. 2961-2969) has been found to produce good results, but other alignment mechanisms may be used in its place. In the present example, two feature maps are extracted from the backbone part 510 of the network. For the head of the network generating the feature vector and (refined) bounding box, a 7×7×256 feature map is used. For the head of the network used to generate the mask and mask confidence score, a 14×14×256 feature map is used. In other examples, different sized feature maps could be used.

TABLE 1 data dimensions at each layer of the modified Mask R-CNN network

| Output of . . . | Dimensions | Output of . . . | Dimensions |
| --- | --- | --- | --- |
| ROIAlign 521 | 7 × 7 × 256 | ROIAlign 531 | 14 × 14 × 256 |
| FC 522 | 1 × 1 × 1024 | Conv 532 | 14 × 14 × 256 |
| FC 524 | 1 × 1 × 1024 | Conv 534 | 28 × 28 × 256 |
| FC 526 | 1 × 1 × 256 | Conv 536 | 28 × 28 × 1 |
| FC 528 | 4 × 2 | Concat 540 | 14 × 14 × 257 |
| | | Conv 542 | 14 × 14 × 257 |
| | | Conv 544 | 14 × 14 × 257 |
| | | FC 546 | 1 × 1 × 1024 |
| | | FC 548 | 1 × 1 × 1024 |
| | | FC 549 | 1 × 1 × 1 |

The modified Mask R-CNN network, M, typically generates several masks and corresponding feature vectors for each instance. From these, the single best mask and feature vector for each object instance must be selected. The selection is based on a combination of the outputs of M. The present implementation uses a combination of the objectness score and the mask confidence score. The feature vectors corresponding to the selected masks are used to find matches between the segmented objects during an object matching process.

For a set of $\Omega$ real objects in the input pair of frames, Mask R-CNN normally, for each object i in $\Omega$, finds sets $J_1$ and $J_2$ of candidate object-instances in frames I1 and I2, respectively. Rather than outputting a class prediction vector, the proposed modified instance segmentation network, for each predicted instance j, outputs a feature vector, e.g. a 256 dimensional feature vector $f_j \in R^{256}$. Ideally, for two given object instances, if they correspond to the same physical object, the network learns to output feature vectors that are as close as possible in feature space. If the two instances correspond to different physical objects, the network learns to output feature vectors that are as distant as possible in feature space. These feature vectors can be used to identify the matching objects in both frames.

This is realised by minimising a loss function, $L_F$, defined as follows. Let $\Omega$ be the set of all objects in the frame pair. For each object $i \in \Omega$, a random feature vector $f_i$ is selected to represent it. Two random subsets are then selected. The first set, $F_m$, consists of other matching feature vectors (i.e. other feature vectors corresponding to the same object i). The second set, $F_n$, consists of non-matching feature vectors, which correspond to objects other than i. Both subsets contain as many candidates as possible, up to a maximum of 9.

From these subsets, a similarity loss $L_s$ and a dissimilarity loss $L_d$ are then calculated. These are defined as follows:

$$L_s(i) := \frac{1}{|F_m|} \sum_{f \in F_m} |f_i - f|$$

$$L_d(i) := w - \frac{1}{|F_n|} \sum_{f \in F_n} |f_i - f|$$

In both cases above, the L1 norm is used when finding the distance $|f_i - f|$. The value w controls the margin of positive and negative dissimilarity and in the present example is set to 2.

The total loss function for the whole frame pair is then:

$$L_F := \frac{1}{|\Omega|} \sum_{i \in \Omega} \max(0, L_s(i) + L_d(i))$$

The mask confirmation branch consists of two convolutional layers 542, 544 ending in three fully connected layers 546, 548 and 549 receiving the input from the concatenation operation 540, and calculating a mask confidence score for each estimated mask. During the training, the loss function minimised is the L1 norm between this mask confidence score and the Intersection over Union (IoU) of the estimated mask and the ground truth mask. In other words, this branch yields an estimation of how accurate the estimated mask is.

The modified Mask R-CNN finds many candidates in both frames. The proposed method seeks to identify the best candidate corresponding to each object instance in each frame, and find matches between them. This is achieved using a five-stage process, as already outlined above with reference to FIG. 3:
 1) Initial clustering
 2) Removing low-quality candidates
 3) Splitting incorrectly joined clusters
 4) Selecting best candidates
 5) Final greedy matching Firstly (see FIG. 3: step 310), a clustering algorithm such as HDBScan is applied. Clustering is performed based upon the 256-dimensional feature vector extracted for each object instance during the instance segmentation stage. Secondly (see FIG. 3: step 320), low-quality instances whose objectness, mask confidence score or mask area falls below a threshold are removed. It is still possible that two similar-looking objects from one frame form part of the same cluster. To resolve these issues, the clusters from each frame are split if the centroids of the instances are too far apart, using the elbow method for k-means (see FIG. 3: step 330). Details of the elbow method can be found in R. L.

Thorndike, "Who belongs in the family," in Psychometrika, 1953. In the fourth step (see FIG. 3: step 340), a single best object instance is identified for each cluster in each frame. The object instance selected is the one with the largest mask area. In the fifth step (see FIG. 3: step 350), these best instances are matched between the two frames in a greedy fashion, based on the Euclidean distance between their 256-d feature vectors. The masks estimated for each of the matched objects and the displacement between the corresponding centroids of those masks is used to generate a translation-only flow field $\hat{D}_t$.

Figure 6:
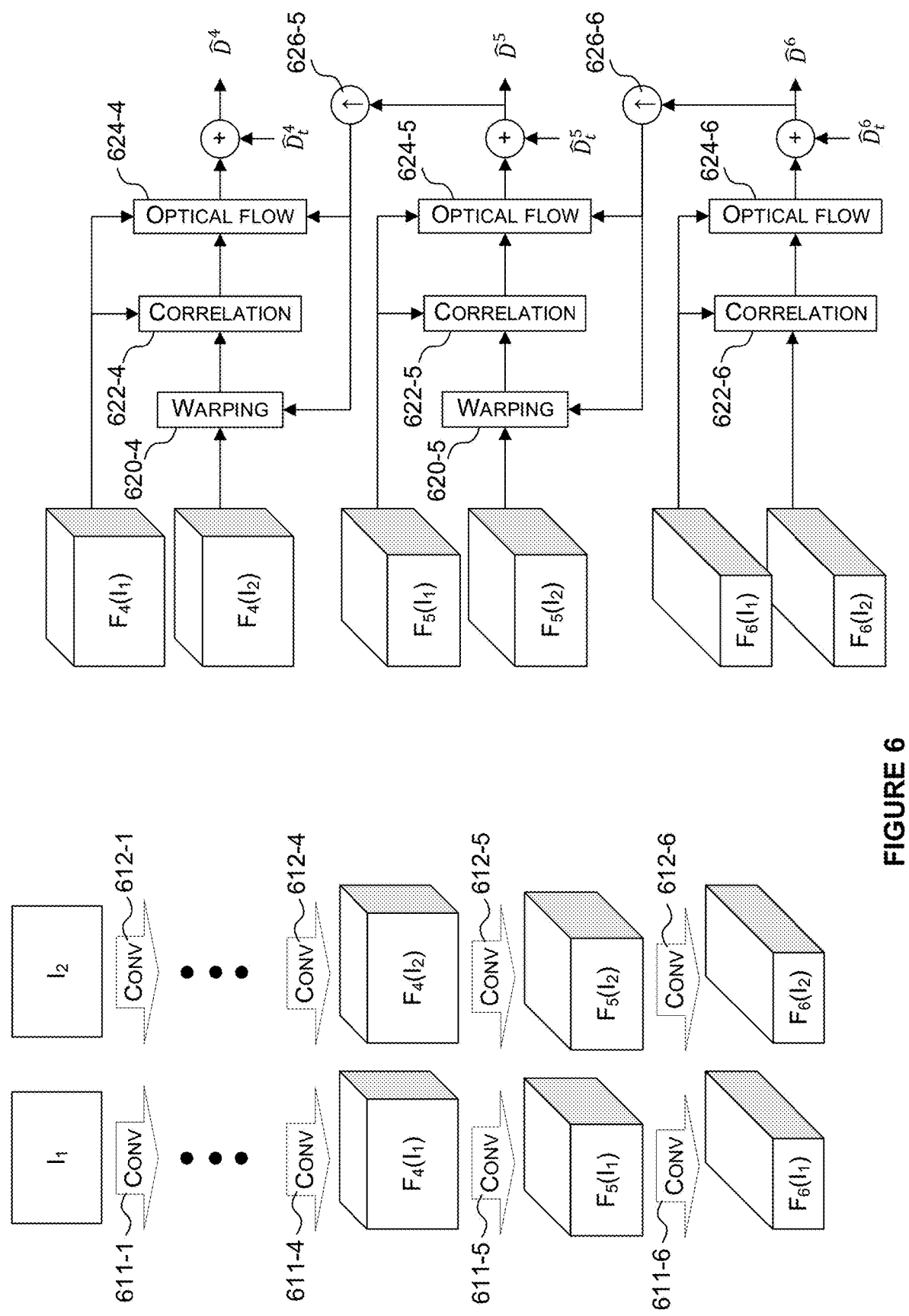
FIG. 6 illustrates a motion estimation method using a neural network, according to an embodiment.

FIG. 6 illustrates a method of motion estimation used to refine the translation-only flow field. In this implementation, an adapted PWC-Net architecture is used for the refinement network G; however, other motion estimation networks could be used for this purpose. PWC-Net is a pyramid-style network, estimating optical flow at a low resolution first, and then successively up-sampling and estimating at higher resolutions until a full-scale flow field is obtained. The architecture is modified to incorporate $\hat{D}_t$ at the lowest three resolutions as depicted in FIG. 6. In the lowest resolution, $\hat{D}_t^6$ is added to the estimated motion field just before being upsampled to be used in the next resolution. $\hat{D}_t^6$ is $\hat{D}_t$ that is resized and re-scaled to match the estimation in the $6^{th}$ resolution. In the $5^{th}$ and $4^{th}$ scales, coarse estimates $\hat{D}_t^5$ and $\hat{D}_t^4$ are added to the estimated motion of the network in the same way, to mimic a residual layer. All three additions are weighted by separate parameters, alpha, to control the contribution of $\hat{D}_t$ at each resolution independently. These values $\alpha_6, \alpha_5, \alpha_4$ (not shown in FIG. 6) are trained together with the other network weights to optimise the contribution of the translation flow at each level. The inventors' experiments show that adding $\hat{D}_t$ to scales beyond the $4^{th}$ scale does not provide a substantial improvement in the results. Without wishing to be bound by theory, it is believed that this may be because $\hat{D}_t$ contains small inaccuracies due to errors in object masks etc., and lacks fine details. If $\hat{D}_t$ is added at the highest resolutions, the network has little opportunity to resolve these issues.

The process in FIG. 6 will now be described in detail. The features for the motion estimation are firstly extracted by a series of convolutional layers—layers 611-1 to 611-6 extract the features for the first frame, and layers 612-1 to 612-6 extract the features for the second frame. The extracted features are then used for multi-resolution motion estimation. At the lowest ($6^{th}$) resolution, a correlation operation 622-6 is used to compare the features $F_6(I_1)$ extracted from the first image with the features $F_6(I_2)$ extracted from the second image. The features $F_6(I_1)$ extracted from the first image, together with the output of the correlation operation 622-6, are provided as inputs to an optical flow estimation process 624-6. This process uses a trained neural network to estimate the non-translational part of the motion vector field. As explained above, the coarse estimate $\hat{D}_t^6$ of the translational part of the motion vector field is added to the output of the optical flow estimation 624-6, to produce the combined estimate for the $6^{th}$ resolution, $\hat{D}^6$. This estimate is up-sampled by up-sampling step 626-6, for use at the next higher resolution (that is, the $5^{th}$ resolution). Using the up-sampled motion field estimate $\hat{D}^6$ from the $6^{th}$ resolution, the features $F_5(I_2)$ extracted from the second image are warped, in step 620-5. To the extent that the estimate from the $6^{th}$ resolution is accurate, this will tend to align the features from the first and second images, at the $5^{th}$ resolution. The warped features from the second image and the features $F_5(I_1)$ from the first image are input to correlation operation 622-5. From here, the process continues as for the $6^{th}$ resolution, calculating the correlation 622-5, estimating the optical flow 624-5, adding the coarse estimate $\hat{D}_t^5$ of the translational part of the motion vector field, and up-sampling 626-5 the resulting combined estimate $\hat{D}^5$. The same is done at the $4^{th}$ resolution, where like reference numerals are used for like operations. Note that the $3^{rd}, 2^{nd}$, and $1^{st}$ resolutions are not shown in the diagram, for simplicity. These are processed similarly to the $6^{th}$ $5^{th}$ and $4^{th}$ resolutions, with the exception that no coarse estimate $\hat{D}_t$ of the translational part of the motion vector field is added to the output of the optical flow estimation. Note also that the weighting by the trained values alpha is not shown in FIG. 6 either—again, for simplicity. Details of the construction of the neural network for optical flow estimation 624 can be found in (D. Sun, X. Yang, M.-Y. Liu, and J. Kautz, "Pwc-net: Cnns for optical flow using pyramid, warping, and cost volume," in Proceedings of the IEEE Conference on Computer Vision and Pattern Recognition, 2018, pp. 8934-8943). It will be appreciated that the present method differs from PWCNet in that the neural network is trained to estimate motion residuals at the lowest scales, rather than directly estimating the motion field. However, this need not affect the structure of the network.

Figure 7:
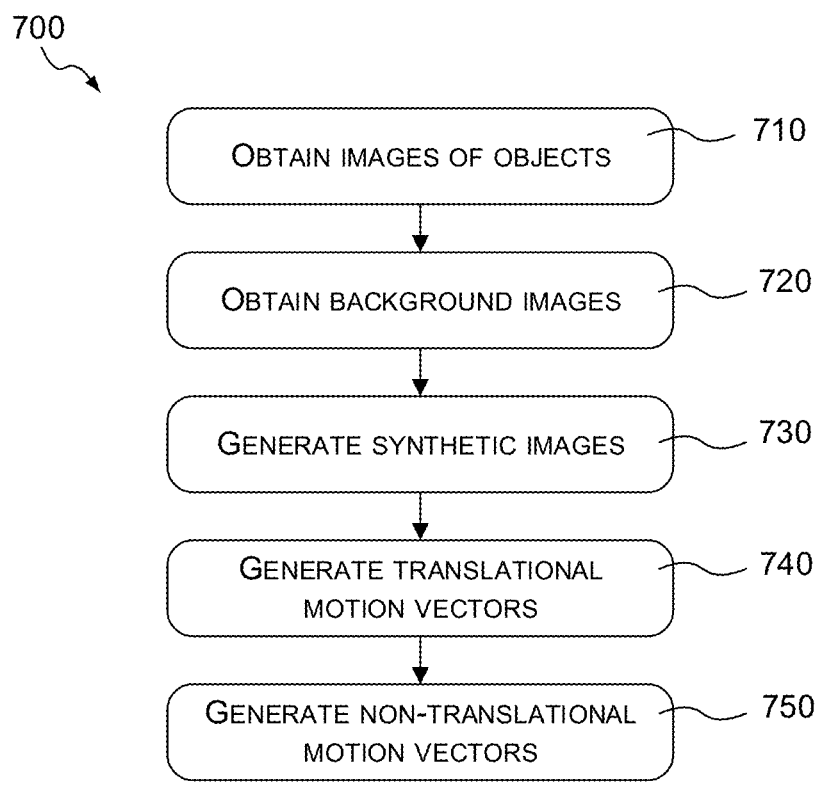
FIG. 7 is a flowchart illustrating a method of generating a training dataset, according to an embodiment.
Figure 8:
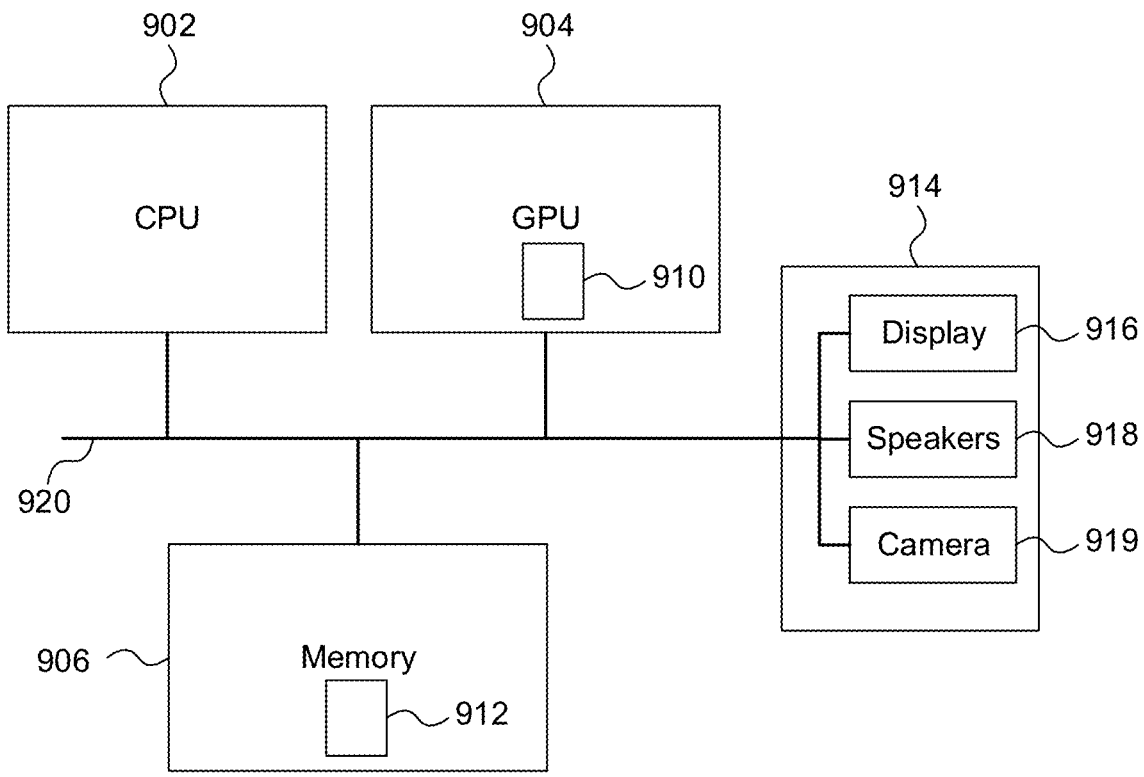
FIG. 8 shows a computer system in which a processing system according to an embodiment is implemented.

FIG. 7 is a flowchart illustrating a method of generating a training dataset, according to an embodiment. As discussed already above, the present inventors have found that it can be advantageous to generate motion vector estimates in two parts—namely, a translational component and a non-translational component. This is based on the observation that different algorithms may be better suited to estimating these two different parts of the motion vector field. It will be noted that the generation of both the translational and non-translational motion vector components, in the example described above, relied upon the use of machine learning algorithms—in particular, neural networks. In order to train such algorithms, suitable training data and associated ground truth motion vectors are needed. It would be desirable to separate the ground truth motion vectors into translational and non-translational components, in order to support training of the different parts of the overall motion estimation algorithm. Accurate ground truth motion vectors are difficult or impossible to obtain for arbitrary natural frames. Therefore, the present inventors propose to synthesise a training dataset. FIG. 7 is an example of a method for doing this. The method of FIG. 7 may be implemented by any suitable apparatus, including, for example, a suitably programmed computer system. The method may be performed by a CPU 902 and/or GPU 904 of a computer system as illustrated in FIG. 8, for instance.

Preferably, the dataset is sufficiently large and diverse to deliver robust performance in the machine learning algorithms trained using it. The dataset preferably contains objects undergoing large translations and varying significantly in appearance due to large rotations, occlusions or lighting changes.

In step 710, the computer system obtains a plurality of images of objects. For the present example, the present inventors downloaded a large number of 3D object files from Archive3D (https://archive3d.net/). These files were automatically processed to remove any problematic models—for example, rejecting models containing excessively many or too few faces, and rejecting models consisting of multiple disjoint parts. The remaining models were divided randomly into disjoint 'test' and 'train' sets of 4,000 and 12,000 objects respectively. In step 720, the computer system obtains a plurality of images of backgrounds. For the present example, the backgrounds consist of a plane textured with a randomly selected image from the OpenImages dataset (A. Kuznetsova, H. Rom, N. Alldrin, J. Uijlings, I. Krasin, J. Pont-Tuset, S. Kamali, S. Popov, M. Malloci, T. Duerig, and V. Ferrari, "The open images dataset v4: Unified image classification, object detection, and visual relationship detection at scale," arXiv:1811.00982, 2018.). A random rotation and translation is then applied to the background.

In step 730, the computer system generates a plurality of pairs of synthetic images, each pair comprising a first frame and the second frame. Each first frame comprises a selection of objects in first positions and first orientations superimposed on a selected background. The second frame comprises the same selection of objects in second positions and second orientations, superimposed on the selected background, wherein at least some of the second positions and second orientations are different from the first positions and first orientations. In the present example, this is done by rendering objects as described above on the background images described above. When rendering, the objects are either retained in their initial appearance, or are randomly textured using either natural images from the OpenImages dataset, texture-like images from ImageAfter (http://www.imageafter.com/), or procedurally generated textures produced using Blender (B. O. Community, Blender—a 3D modelling and rendering package, Blender Foundation, Stichting Blender Foundation, Amsterdam, 2018, http://www.blender.org). Each image pair in the dataset was generated by selecting a random group of objects, generating textures as outlined above, and generating a random trajectory for each object. Of course, the image pairs could also be synthesised in other ways and it is not essential to use these source datasets or tools.

In step 740, the computer system generates translational ground-truth motion vectors, describing the difference between the first positions and the second positions. The computer system further generates (in step 750) non-translational ground-truth motion vectors, describing the difference between the first orientations and the second orientations. Because the image pairs are synthesised, rather than natural images, this ground truth data is always available as part of the synthesis process.

Note that either the translational ground-truth motion vectors or the non-translational ground-truth motion vectors may be expressed and stored explicitly or implicitly. For example, the computer system may store the translational ground-truth motion vectors and combined ground-truth motion vectors, which are the sum of the translational and non-translational components. Those skilled in the art will appreciate that storing one of the components and the sum of both components is equivalent to storing the two components.

In the present example, colour images, object index maps and ground truth flow maps (combined motion vectors) are rendered. Additionally, ground truth flow fields for the translation component of the motions are produced. These contain the flow field resulting when each object only undergoes the translation component of the trajectory. This extra ground truth flow field is useful for evaluating the accuracy of the translation flow estimate $\hat{D}_t$. The rendering itself used the Cycles renderer (https://www.cycles-renderer.org/), which is capable of simulating realistic global illumination (GI) effects.

The examples above have all focused on motion estimation between a pair of frames. It goes without saying that the techniques disclosed may be extended to greater numbers frames—for example, by applying them to successive pairs of frames in a longer sequence.

FIG. 8 shows a computer system in which the graphics processing systems described herein (including image processing system 100) may be implemented. The computer system comprises a CPU 902, a GPU 904, a memory 906 and other devices 914, such as a display 916, speakers 918 and a camera 919. A processing block 910 (corresponding to processing blocks 120-150 in FIG. 1) is implemented on the GPU 904. In other examples, the processing block 910 may be implemented on the CPU 902, or on a Neural Network Accelerator (NNA) which may be provided in addition to or instead of either the CPU or GPU. The components of the computer system can communicate with each other via a communications bus 920. A store 912 (corresponding to memory 110) is implemented as part of the memory 906.

The processing systems of FIGS. 1 and 5-6 are shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing systems described herein may be embodied in hardware on an integrated circuit. The processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing system configured to perform any of the methods described herein, or to manufacture a processing system comprising any apparatus described herein. An integrated circuit definition dataset may be, for example, an integrated circuit description.

Therefore, there may be provided a method of manufacturing, at an integrated circuit manufacturing system, a processing system as described herein. Furthermore, there may be provided an integrated circuit definition dataset that, when processed in an integrated circuit manufacturing system, causes the method of manufacturing a processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing system will now be described with respect to FIG. 9.

Figure 9:
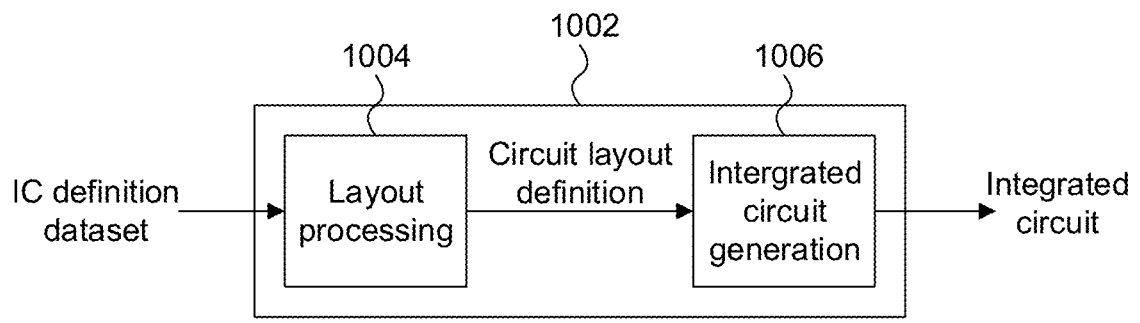
FIG. 9 shows an integrated circuit manufacturing system for generating an integrated circuit embodying a processing system.

FIG. 9 shows an example of an integrated circuit (IC) manufacturing system 1002 which is configured to manufacture a processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 1002 to manufacture an integrated circuit embodying a processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of analyzing one or more objects in a set of frames comprising at least a first frame and a second frame, the method comprising:
    segmenting the first frame to produce a plurality of first masks, each first mask being a pixel map identifying pixels belonging to a potential object-instance detected in the first frame;
    for each potential object-instance detected in the first frame, extracting from the first frame a first feature vector characterising the potential object-instance;
    segmenting the second frame to produce a plurality of second masks, each second mask being a pixel map identifying pixels belonging to a potential object-instance detected in the second frame;
    for each potential object-instance detected in the second frame, extracting from the second frame a second feature vector characterising the potential object-instance; and
    matching at least one of the potential object-instances in the first frame with one of the potential object-instances in the second frame, based at least in part on the first feature vectors, the first masks, the second feature vectors and the second masks,
    wherein the matching comprises clustering the potential object-instances detected in the first and second frames, based at least in part on the first feature vectors and the second feature vectors, to generate clusters of potential object-instances.

2. The method of claim 1, wherein the matching further comprises, for each cluster in each frame:
    evaluating a distance between the potential object-instances in the cluster in that frame; and
    splitting the cluster into multiple clusters based on a result of the evaluating.

3. The method of claim 1, wherein the matching comprises selecting a single object-instance from among the potential object-instances in each cluster in each frame.

4. The method of claim 3, wherein the matching comprises matching at least one of the single object-instances in the first frame with a single object-instance in the second frame.

5. The method of claim 1, wherein the matching comprises rejecting potential object-instances based on any one or any combination of two or more of the following:
    an object confidence score, which estimates whether a potential object-instance is more likely to be an object or part of the background;
    a mask confidence score, which estimates a likelihood that a mask represents an object; and
    a mask area.

6. The method of claim 5, wherein the mask confidence score is generated by a machine learning algorithm trained to predict a degree of correspondence between the mask and a ground truth mask.

7. The method of claim 1, wherein the masks and feature vectors are generated by a first machine learning algorithm.

8. The method of claim 1, further comprising for at least one matched object in the first frame and the second frame, estimating a motion of the object between the first frame and the second frame.

9. The method of claim 8, wherein estimating the motion of the object comprises, for each of a plurality of pixels of the object:
    estimating a translational motion vector;
    estimating a non-translational motion vector; and
    calculating a motion vector of the pixel as the sum of the translational motion vector and the non-translational motion vector.

10. The method of claim 8, wherein estimating the motion of the object comprises:
    generating a coarse estimate of the motion based at least in part on the mask in the first frame and the corresponding matched mask in the second frame; and
    refining the coarse estimate using a second machine learning algorithm,
    wherein the second machine learning algorithm takes as input the first frame, the second frame, and the coarse estimate, and
    the second machine learning algorithm is trained to predict a motion difference between the coarse motion vector and a ground truth motion vector.

11. The method of claim 10, wherein the machine learning algorithm is trained to predict the motion difference at a plurality of resolutions, starting with the lowest resolution and predicting the motion difference at successively higher resolutions based on up-sampling the motion difference from the preceding resolution.

12. An image processing system, comprising:
a memory, configured to store a set of frames comprising at least a first frame and a second frame; and
a first segmentation block, configured to segment the first frame, to produce a plurality of first masks, each first mask being a pixel map identifying pixels belonging to a potential object-instance detected in the first frame;
a first feature extraction block, configured to, for each potential object-instance detected in the first frame, extract from the first frame a first feature vector characterising the potential object-instance;
a second segmentation block, configured to segment the second frame, to produce a plurality of second masks, each second mask being a pixel map identifying pixels belonging to a potential object-instance detected in the second frame;
a second feature extraction block, configured to, for each potential object-instance detected in the second frame, extract from the second frame a second feature vector characterising the potential object-instance; and
a matching block, configured to match at least one of the potential object-instances in the first frame with one of the potential object-instances in the second frame, based at least in part on the first feature vectors, the first masks, the second feature vectors and the second masks,
wherein the matching block is configured to cluster the potential object-instances detected in the first and second frames, based at least in part on the first feature vectors and the second feature vectors, to generate clusters of potential object-instances.

13. The image processing system of claim 12, wherein the first and second segmentation blocks are the same segmentation block, and/or the first and second feature extraction blocks are the same feature extraction block.

14. The image processing system of claim 12, further comprising a motion estimation block, configured to estimate the motion of objects matched by the matching block.

15. The image processing system of claim 12, wherein the matching block is further configured to, for each cluster in each frame:
evaluate a distance between the potential object-instances in the cluster in that frame; and
split the cluster into multiple clusters based on a result of the evaluating.

16. The image processing system of claim 12, wherein the matching block is configured to, for each cluster in each frame, select a single object-instance from among the potential object-instances of that cluster,
and to match one of the single object-instances in the first frame with a single object-instance in the second frame.

17. The image processing system of claim 12 wherein the masks and feature vectors are generated by a first machine learning algorithm.

18. A non-transitory computer readable storage medium having stored thereon computer readable code configured to cause to be performed, when the code is run, a method of analyzing one or more objects in a set of frames comprising at least a first frame and a second frame, the method comprising:
segmenting the first frame, to produce a plurality of first masks, each first mask being a pixel map identifying pixels belonging to a potential object-instance detected in the first frame;
for each potential object-instance detected in the first frame, extracting from the first frame a first feature vector characterising the potential object-instance;
segmenting the second frame, to produce a plurality of second masks, each second mask being a pixel map identifying pixels belonging to a potential object-instance detected in the second frame;
for each potential object-instance detected in the second frame, extracting from the second frame a second feature vector characterising the potential object-instance; and
matching at least one of the potential object-instances in the first frame with one of the potential object-instances in the second frame, based at least in part on the first feature vectors, the first masks, the second feature vectors and the second masks,
wherein the matching comprises clustering the potential object-instances detected in the first and second frames, based at least in part on the first feature vectors and the second feature vectors, to generate clusters of potential object-instances.

* * * * *